(12) United States Patent
Bailly et al.

(10) Patent No.: US 8,149,092 B2
(45) Date of Patent: Apr. 3, 2012

(54) DEVICE AND METHOD FOR MANAGING EQUIPMENT MAINTENANCE

(75) Inventors: Carine Bailly, Tournefeuille (FR); Christian Albouy, Saint Alban (FR); Francois Fournier, Roques/sur/Garonne (FR)

(73) Assignee: Thales (FR)

( * ) Notice: Subject to any disclaimer, the term of this patent is extended or adjusted under 35 U.S.C. 154(b) by 1118 days.

(21) Appl. No.: 11/938,099

(22) Filed: Nov. 9, 2007

(65) Prior Publication Data

US 2008/0129459 A1    Jun. 5, 2008

(30) Foreign Application Priority Data

Nov. 10, 2006    (FR) ...................................... 06 09843

(51) Int. Cl.
*H04Q 5/22*    (2006.01)
(52) U.S. Cl. ..................................................... 340/10.1
(58) Field of Classification Search .................. 340/10.1, 340/5.1, 825.72, 438, 13, 32
See application file for complete search history.

(56) References Cited

U.S. PATENT DOCUMENTS

| 7,183,924 | B1 * | 2/2007 | Ku .............................. 340/572.1 |
| 7,272,519 | B2 * | 9/2007 | Lesesky et al. .................. 702/63 |
| 7,683,762 | B2 * | 3/2010 | Kinoshita .................... 340/10.4 |
| 2005/0242943 | A1 | 11/2005 | Matsumoto et al. |

* cited by examiner

*Primary Examiner* — Vernal Brown
(74) *Attorney, Agent, or Firm* — Lowe Hauptman Ham & Berner, LLP (57) ABSTRACT

The subject of the invention is a device for managing equipment maintenance. It relates to a device for managing maintenance of a number N of items of equipment EQi built into a system, i designating an index identifying the item of equipment EQi and lying between 1 and N, the system furthermore comprising a main computer RC, the equipment $EQ_i$ exchanging data with the main computer RC through a communication network, the equipment $EQ_i$ being capable of being built into the system or of being removed from the system, each item of equipment $EQ_i$ being protected by a protective housing $BP_i$, the communication node $N_j$ occupying a position internal to the housing $BP_i$ and being devised to exchange data with the radio tag $ET_i$, the radio tag $ET_i$ being fixed securely to the housing $BP_i$ and being devised to deliver data through a contactless link.

18 Claims, 7 Drawing Sheets

DEVICE AND METHOD FOR MANAGING EQUIPMENT MAINTENANCE

RELATED APPLICATIONS

The present application is based on, and claims priority from, France Application Number 06 09843, filed Nov. 10, 2006, the disclosure of which is hereby incorporated by reference herein in its entirety.

TECHNICAL FIELD

The field of the invention is that of the management of equipment maintenance. The invention relates more precisely to a device for managing maintenance of electronic equipment which is built into a system.

BACKGROUND OF THE INVENTION

Maintenance teams are responsible for maintaining the operation of a system based on observations of users of the system or on messages originating from test devices built into the equipment to establish an equipment failure diagnostic, identify and locate system equipment failures, and if required, replace a failed item of equipment, in part or in full. The gathering of messages and observations serving to track down equipment failures is called maintenance management.

The invention also relates to a method of managing equipment maintenance.

The architecture of complex systems is in general based on information transfers between electronic equipment linked together by a communication network. The location of the equipment in the system sometimes complies with harsh specifications regarding dimensions, moreover, the equipment can be difficult to access and be from about ten centimetres to several hundred metres away: such is the case for example with equipment built into an airborne aeronautical system.

The electronic equipment built into a system comprises software and hardware components. This equipment in general possesses a configuration which fully identifies its components to the manufacturer of the item of equipment and to the system. The configuration takes the form of one or more identifiers which can be fixed to the item of equipment, such as for example wording on a tag stuck on the external surface of a wall of a housing protecting the item of equipment. The configuration of an item of equipment allows a maintenance team to replace a failed item of equipment with a new item of equipment comprising the same configuration or a configuration for which a manufacturer of the item of equipment can guarantee that the item of equipment which carries it operates in a manner compatible with the failed item of equipment. The configuration of an item of equipment also makes it possible to alert the manufacturer of the item of equipment as to the existence of a chronic failure of a type of its equipment. When the manufacturer is informed of all the failures encountered by its equipment while operational, this information allows it to note that a failure frequency for a type of this equipment is abnormally high. In this way, the manufacturer can pinpoint a weakness of a type of equipment and propose a corrective to the equipment of this type.

An applicable configuration of a system is a list consisting of configurations of the various items of equipment built into the system. The configuration of the equipment can alter over time, one then speaks of system configuration management which is based on equipment configuration management.

For systems designed before the 1970s, equipment configuration management could in general be described as "static", that is to say the applicable configuration of a system amounted merely to a system configuration register, for example a document in paper form, which contained all the configurations of the items of equipment built into the system. Any alteration in a configuration of one of the items of equipment built into the system was recorded manually in the configuration register.

The static character of this type of configuration management exhibits the drawback of making it very irksome to carry out a final check of compatibility between the configuration of the equipment built into a system and the applicable configuration of the system. This check can take place for example at the time of a system startup, and serves to cover the risk consisting of erroneous replacement of a failed item of equipment by an item of equipment whose configuration is not in accordance with that recorded in the configuration register. The erroneous replacement takes place between two successive power-ups of the system: it must be detected as early as possible.

More recent design systems generally build in so-called "intelligent" maintenance management, one also speaks of "intelligent system". "Intelligent" configuration management consists in storing the configuration of an item of equipment in a memory internal to the item of equipment. The configuration of the item of equipment is transmitted, while the system is powered, before anything else, to a main computer of the system, by means of a communication network. The communication network links, for example in a star, the main computer and the equipment of the system. The main computer verifies that the configurations that the equipment transmits to it are compatible with the system's applicable configuration which is stored beforehand in one of its internal memories.

In general, the equipment of "intelligent systems" comprises, furthermore, a built-in test device (known as "Built-In-Test Equipment" or by the acronym BITE). The built-in test device delivers, destined for the main computer, messages containing information on the operation of the item of equipment into which it is built, across the communication network. "Intelligent" maintenance management consists in centralizing in a nonvolatile memory MVN belonging to the main computer the messages describing operating anomalies of the equipment built into the system and in producing, on each shutdown of the system, reports summarizing these anomalies. The reports are stored in a nonvolatile memory of the item of equipment concerned so as to be usefully consulted therein by a maintenance team.

However, maintenance management of "intelligent equipment" suffers from a twofold drawback:

In general, it is possible to consult the anomaly report stored in a nonvolatile memory of the item of equipment solely when the item of equipment into which this memory is built is supplied with power and is linked to a communication network. When the item of equipment has been removed from the system by a maintenance team, either because it has been identified as having failed, or because the item of equipment is built into a system which is not supplied with power, the maintenance team must necessarily resort to a test bench to access the anomaly report relating to the item of equipment. A test bench is an installation which is devised to supply power to and access the content of the memories internal to the item of equipment. This installation is expensive and/or bulky and it is not always possible to transport the item of equipment rapidly to a test bench. The delay taken to access the anomaly report can impinge directly on the duration of unavailability of the item of equipment, and may generate a duration of system unavailability which may turn out to be very expensive.

In the prior art, the information which is transmitted in the upward direction, that is to say the messages delivered by the built-in test devices of the equipment and received by the main computer of the system comprise a summary of the results of tests carried out by the built-in test devices. This choice aimed at reducing the volume of data transmitted is dictated in general by limitations related to the maximum information throughput of the communication network, to the reduced capacity of nonvolatile memories. Certain test results relate exclusively to the equipment such as for example, those corresponding to internal location of the fault within the item of equipment or to the local context of the failures, and others being specific, such as for example technical data for the instrumentation of the equipment supplier: these messages are not used by the main computer, it is not necessary to transmit them to it.

For these various reasons, the upward messages therefore do not comprise all the information produced by the built-in test devices. Nevertheless, it may be very instructive, for a maintenance team which has extracted an item of equipment from a system, to ascertain all the results of tests carried out by the built-in test device of the item of equipment, the nature of the operating anomalies of the item of equipment which have been signalled to the main computer by the built-in test devices of other equipment as well as the applicable configuration of the system.

A first known solution for alleviating the drawbacks exhibited by "intelligent systems" is maintenance management based on employing radio tags (or "RFID Tag" or else "Radio-Frequency Identification Tag"). A radio tag is a passive component which has the ability to store information and to communicate it, on request, by means of a contactless link, in general in the radio frequency span.

When such a radio tag, in which a configuration information cue relating to an item of equipment has been stored beforehand, is stuck on the item of equipment, it allows a maintenance team equipped with a radio tag reader to access the configuration information cue relating to the item of equipment, even when the item of equipment is not supplied with power, doing so without resorting to a test bench.

However, the radio tag stuck on an item of equipment does not make it possible to gather all the results of tests carried out by the built-in test device of the item of equipment.

Specifically, the frequency span of the contactless link making it possible to communicate with the radio tag, in general in the radio region, is not suited to a communication over a range exceeding a metre, in an environment that may consist of surfaces made of electrical conducting materials. Maintenance management based solely on employing a radio tag fixed to equipment therefore does not constitute a solution to the problem of communication and then storage of all the results of tests carried out by the test devices built into radio tags.

SUMMARY OF THE INVENTION

The aim of the invention is to alleviate these drawbacks. More precisely, it relates to a device for managing maintenance of a number N of items of equipment EQi (10, 20, 30) built into a system (1), i designating an index identifying the item of equipment EQi (10, 20, 30) and lying between 1 and N, the system (1) furthermore comprising a main computer RC (2), the equipment $EQ_i$ (10, 20, 30) exchanging data with the main computer RC (2) through a communication network, the equipment $EQ_i$ (10, 20, 30) being capable of being built into the system (1) or of being removed from the system (1), each item of equipment $EQ_i$ (10, 20, 30) being protected by a protective housing $BP_i$, the communication node $N_j$ (12, 22, 32) occupying a position internal to the housing $BP_i$ and being devised to exchange data with the radio tag $ET_i$ (11, 21, 31), the radio tag $ET_i$ (11, 21, 31) being fixed securely to the housing $BP_i$ and being devised to deliver data through a contactless link, wherein the housing $BP_i$ comprises:

means of electromagnetic isolation of the communication node $N_i$ which protect the item of equipment $EQ_i$ from electromagnetic emissions produced by the communication node $N_i$;

removable plugging means which mask the radio tag $ET_i$ (11, 21, 31) with respect to the exterior of the housing $BP_i$, the plugging means being in a closed state or in an open state;

and in that the communication node $N_j$ and the tag $ET_i$ are inside a cavity formed by the means of electromagnetic isolation and the removable plugging means, the cavity is sealed when the removable plugging means are in a closed state.

A first advantage of this invention has to do with the compatibility that the device according to the invention exhibits with existing "intelligent" systems. Specifically, by virtue of the means of electromagnetic isolation, a communication node can exchange data with a radio tag fixed to the housing of the item of equipment without interfering with the operation of the remainder of the item of equipment. This exchange can take place during the operation of the item of equipment, just before turning on the item of equipment or else during an interruption to the system power supply. The device according to the invention does not require a new certification of the items of equipment to which they are tied, thereby constituting a very significant economic advantage.

Moreover, information originating from the main computer, such as for example the applicable configuration, can be stored on the radio tag and rendered easily accessible to a maintenance team. The main computer delivers information to a communication node by following the communication network of the system, then the node dispatches this information to the tag. The device according to the invention is based on the existing communication network of the system for conveying information: it does not require additional communication network deployment, thereby also constituting a very significant economic advantage.

Another advantage of the invention has to do with the nature of the information to which the device according to the invention facilitates access. Specifically, it is possible to store in the radio tag both information regarding the present and past failures of an item of equipment so as to constitute an actual log of the interventions undergone by the item of equipment, and also information relating to the systems into which it has been possible to successively build the item of equipment. This information is useful, in certain cases, to facilitate the understanding, by a maintenance team, of the nature and origin of a failure.

The invention also relates to a method of managing maintenance of a number N of items of equipment $EQ_i$ built into a system, i designating an index identifying the item of equipment $EQ_i$ and lying between 1 and N, the item of equipment $EQ_i$ comprising a built-in test device $BITE_i$, the device $BITE_i$ delivering test results messages to a main computer RC (2) of the system, via a communication network of the system, each item of equipment $EQ_i$ comprising a communication node $N_i$ and a tag $ET_i$ and being protected by a protective housing $BP_i$, the communication node $N_j$ occupying a position internal to the housing $BP_i$ and being devised to exchange data with the radio tag $ET_i$, the radio tag $ET_i$ being fixed securely to the housing $BP_i$ and being devised to exchange data through a contactless link, the said method being characterized in that it comprises the steps:
transmission by the device $BITE_i$ to the tag $ET_i$, via the communication nodes $N_j$, of the test results;
storage of the test results in a memory of the tag $ET_i$.

BRIEF DESCRIPTION OF THE DRAWINGS

Other characteristics and advantages of the invention will appear on reading the detailed description which follows, given by way of nonlimiting example and with reference to the appended drawings in which.

Across the figures, the same elements are identified by the same references.

DETAILED DESCRIPTION OF THE INVENTION

Figure 1:
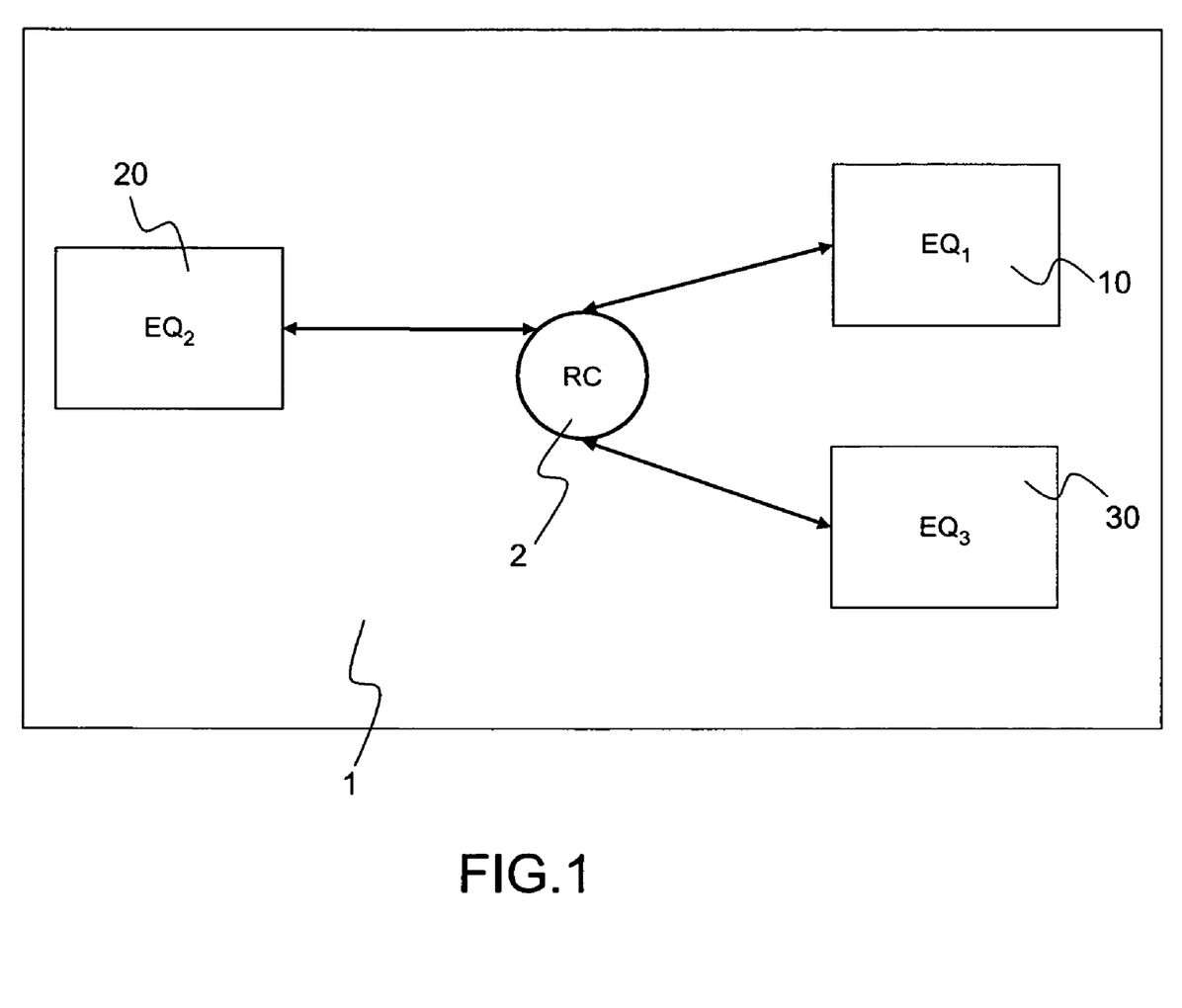
FIG. 1 schematically represents an "intelligent system" according to the prior art.

FIG. 1 represents an "intelligent system", 1 according to the prior art, which comprises a main computer RC and a plurality of items of electronic equipment $EQ_i$, each comprising at least one built-in test device $BITE_i$, and a nonvolatile memory $MVN_i$, i designates an index identifying the equipment $EQ_i$.

Each item of equipment $EQ_i$ is linked directly to the main computer RC by a communication network of the system. The communication network is in general wire-based, that is to say the computer and the equipment each comprise an electrical connector and at least one electrical conductor cable links the connector of the main computer to the connector of the item of equipment. The network can also be "wireless", that is to say all the equipment communicates with the main computer through a communication network not comprising any electrical conductor cable. The built-in test devices $BITE_i$, the nonvolatile memories $MVN_i$ of the item of equipment $EQ_i$ and the electrical connectors are not represented in the figure.

On the communication network, the main computer RC exchanges data and commands with the electronic equipment $EQ_i$. While the system is powered, a configuration of the item of equipment, stored on a memory internal to the item of equipment, can furthermore be communicated to the main computer RC so that it verifies that the items of equipment $EQ_i$ which are connected to the network all in fact possess a configuration compatible with its applicable configuration.

Test results messages delivered by the built-in test devices $BITE_i$ are also transmitted by the communication network, in the upward direction, that is to say the messages are delivered by the electronic equipment $EQ_i$ and are intended for the main computer. On account notably of restricted throughput of the communication network, these messages have a content which does not represent the entirety of the results of tests performed by the devices $BITE_i$. The main computer produces reports summarizing the test results messages. These reports are dispatched and stored in the nonvolatile memories of the equipment $MVN_i$.

When a test result message contains an information cue relating to a failure of an item of equipment, for example a failure of the item of equipment $EQ_1$, the system can, as a function of the type of failure, decide to use or to ignore the data and the commands delivered by the item of equipment $EQ_1$. In all cases, it registers in the nonvolatile memories $MVN_i$ of the equipment $EQ_i$ a test result report comprising at least one reference of the item of equipment that emitted the test result message, a content of the test result message and for example a date of receipt, a date of sending or creation of the test result message by the main computer RC or by the item of equipment $EQ_i$.

In the course of a maintenance operation, a maintenance team can read the content of the nonvolatile memory $MVN_i$. The maintenance team bases itself on this content to carry out a diagnostic regarding the nature of the failure and/or the location of the failed item of equipment $EQ_1$ in the system: the diagnostic can lead to the failed item of equipment $EQ_1$ being replaced. The reading of the content of the nonvolatile memory $MVN_i$ can be carried out, for example, by means of a second connector termed the "maintenance connector" disposed on a part of the item of equipment $EQ_1$ accessible to the maintenance team without it being necessary to extract the item of equipment from the system. The reading of the content of the nonvolatile memory $MVN_i$ requires that the item of equipment be supplied with power.

The maintenance connectors are not represented in the figure.

When the maintenance team extracts an item of equipment from the system before having read the content of the memory $MVN_i$, for example because of a position of the item of equipment in the system hindering access to the maintenance connector, the team must nevertheless access the messages delivered by the built-in test device of the item of equipment and determine the configuration of the failed item of equipment so as to carry out its diagnostic. Accordingly, because the item of equipment $EQ_i$ is not supplied with power, the maintenance team can on the one hand consult configuration information appearing on a tag fixed to the item of equipment, on condition that this information is up to date and reflects the real configuration of the item of equipment at the time of the failure, on the other hand the maintenance team must necessarily resort to a test bench to access the test results which are stored in the nonvolatile memory $MVN_i$ of the item of equipment $EQ_i$.

Figure 2:
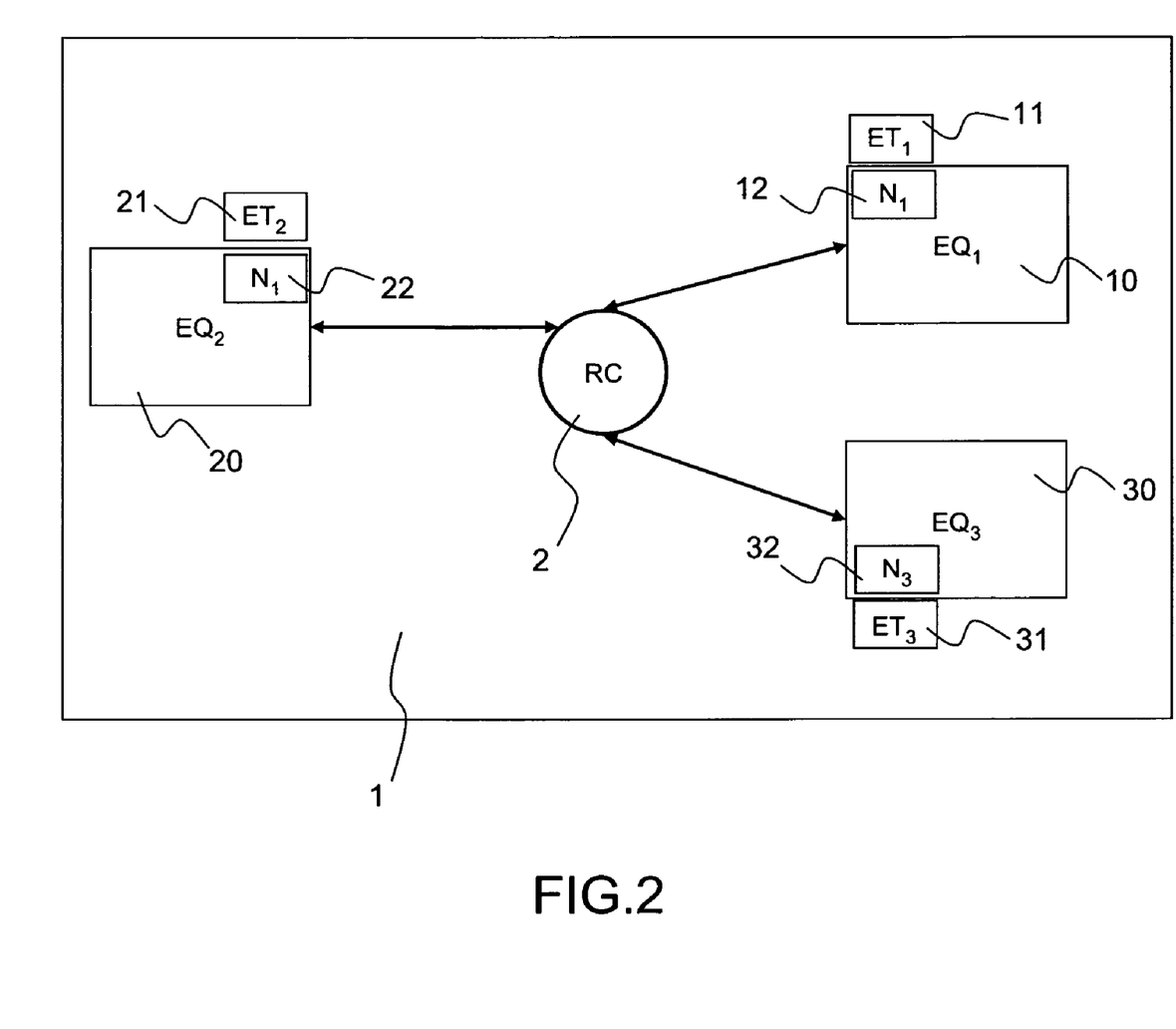
FIG. 2 schematically represents a system comprising a maintenance management device according to the invention.

FIG. 2 represents "intelligent system" 1 comprising a maintenance management device according to the invention.

The system furthermore comprises a main computer RC and a plurality of items of electronic equipment $EQ_i$, each comprising at least one built-in test device $BITE_i$, a nonvolatile memory $MVN_i$, i designates an index identifying the equipment. Each item of equipment $EQ_i$ is protected by a protective housing $BP_i$.

The device according to the invention comprises a number N of radio tags $ET_i$, and N communication nodes $N_i$.

Each tag $ET_i$ is fixed securely to the protective housing $BP_i$.

A communication node $N_i$ occupies a position internal to the housing $BP_i$ and each communication node $N_i$ is devised to exchange data with the radio tags $ET_i$.

Thus, on each item of equipment $EQ_i$ there is a radio tag $ET_i$ able to store notably a configuration information cue relating to the item of equipment $EQ_i$.

The information stored in the radio tag $ET_i$ is accessible to a maintenance team equipped with a radio tag reader/marker. Access to the stored information cue can take place when the item of equipment $EQ_i$ is not supplied with power or when the item of equipment is not built into the system on condition that the tag reader/marker delivers an electromagnetic signal able to be received by the radio tag $ET_i$. The radio tag reader/marker establishes a contactless link with the radio tag $ET_i$. In order for the maintenance team to access the information cue stored in the tag $ET_i$, it is preferable that the radio tag reader/marker can be placed in direct proximity to the tag $ET_i$, within view of the latter.

Advantageously, the radio tag $ET_i$ comprises:
a receiver $RE_i$ of data delivered by a communication node $N_i$;
a memory $ME_j$ for storing data;
an emitter $EE_j$ for delivering data to a communication node $N_i$, on request;
Advantageously, the communication node $N_i$ comprises:
a receiver, $RN_i$ of data delivered by a radio tag $ET_i$;
an emitter $EN_i$ for delivering data to a radio tag $ET_i$.
Each housing $BP_i$ comprises:
means of electromagnetic isolation of the communication node $N_i$, the means of electromagnetic isolation protect the item of equipment $EQ_i$ from electromagnetic emissions produced by the communication node $N_i$;
removable means of plugging the radio tag $ET_i$ (11, 21, 31) with respect to the exterior of the housing $BP_i$, the plugging means being in a closed state or in an open state;

The means of electromagnetic isolation and the removable plugging means are not represented in FIG. 2.

The means of electromagnetic isolation consist, for example, of a parallelepiped, comprising five walls made of electrical conductor materials, which block possible electromagnetic emissions produced by the communication node $N_i$ towards components of the item of equipment $EQ_i$.

The removable plugging means mechanically protect the radio tag. They consist for example of a wall made of an electrical conductor material able to close the parallelepiped consisting of the isolation means. The means of electromagnetic isolation and the removable plugging means form a cavity which encloses the communication node $N_i$ and the tag $ET_i$, the cavity is sealed when the removable plugging means are in a closed state.

Advantageously, when the removable plugging means are in the closed state, they prevent the radio tag $ET_i$ from delivering data outside the housing $BP_i$.

An initial storage of the configuration information cue relating to the item of equipment $EQ_i$ is carried out by a manufacturer of the item of equipment by means of the radio tag reader/marker devised to "register" data in the memory $ME_j$ of the tag $EQ_i$. This registration can take place when the item of equipment $EQ_i$ is not supplied with power or when the item of equipment is not built into the system.

Subsequently, when the item of equipment is built into the system, the configuration information cue can be modified to reflect, for example, an update of a software component built into the item of equipment $EQ_i$. The modification of the configuration information cue is carried out by a maintenance team.

The maintenance team transmits a new configuration of the item of equipment $EQ_i$ to the item of equipment $EQ_i$ which in its turn transmits this new configuration to the communication node $N_j$. An emitter of the communication node $N_j$ registers the new configuration in a memory of the radio tag $ET_i$ or modifies a configuration stored in the memory of the radio tag $ET_i$.

A radio tag is a passive device which does not require continuous power supply. An information cue stored in the memory that it comprises can be consulted remotely by a communication node or a tag reader/marker devised to read data stored on a radio tag. Consultation of the content of a radio tag comprises the following steps: a communication node transmits a message comprising a request to read desired information cues to the radio tag $ET_i$. The message comprises an energy E: a fraction of the energy E is employed by the radio tag to energize the components that the radio tag $ET_i$ (receiver, memory and emitter) comprises, so as to interpret the request as commands and to execute the commands such as for example to deliver the information desired by the emitter of the radio tag $ET_i$.

Thus, depending on the nature of the data dispatched by a node $N_i$, either the data are received by the receiver $ER_j$ of the radio tag $ET_i$ for which the message is intended and then stored in the memory $ME_j$ of this tag or the emitter $EE_j$ delivers, through a contactless link, data stored beforehand in its memory $ME_j$.

The items of equipment $EQ_i$ are protected from knocks and harsh environments by housings $BP_i$, this being the case for example for aeronautical computers which are distributed in chassis with which an aircraft's holds are equipped. The various equipment $EQ_i$ is built into the systems by a removable connection to the chassis. The radio tags $ET_i$ of a device according to the invention can be, for example, fixed to an external wall of the protective housing $BP_i$ and accessible to the maintenance team without the housing being extracted from the chassis.

The device according to the invention furthermore exhibits an advantageous effect at the equipment maintenance management level. This advantageous effect consists in acceleration and systematization of the transfers of equipment failure information to the equipment manufacturer.

Through the aspects described above, the device according to the invention is employed to manage the maintenance of the equipment built into a system, it also serves to manage equipment configuration and more precisely to ensure when setting up an item of equipment in a system, or when replacing an item of equipment of a system, that the configuration of an item of equipment $EQ_i$ that is built into a system is compatible with the system's applicable configuration defined by the manufacturer of the system.

During shipment of a system comprising a device according to the invention, the manufacturer of the system defines a first information cue regarding applicable configuration of the system and a second information cue regarding identification of the system that he stores in the data concentrator C. In the course of the life of the system, the applicable configuration of the system can be modified, for example subsequent to alterations in configuration of one of the items of equipment built into the system.

It is useful that the maintenance team is cognizant of the first information cue and the second information cue, so as to analyse through cross-checks, whether a failure of a particular item of equipment is related to the configuration of the system into which it is built. Also, the first and the second information cues are transmitted automatically to the radio tags of the device, via the wire-based links and the communication nodes, during a procedure which accompanies each interruption of the system power supply. Thus, during a servicing operation, a maintenance team will have access to these information cues, easily by consulting the content of the memory of a radio tag with the aid of a radio tag reader/marker.

The manufacturer of the system communicates a first information cue regarding applicable configuration of the system and a second information cue regarding identification of the system to the main computer during shipment of the system.

Advantageously, the main computer RC (2) comprises means for transmitting, via the communication nodes $N_i$ (12, 22, 32), the first information cue and the second information cue to all the radio tags $ET_i$ (11, 21, 31), on each interruption of the system power supply.

Advantageously, the main computer RC (2) comprises means for detecting an incompatibility between a configuration information cue relating to an item of equipment $EQ_i$ (10, 20, 30) and the first configuration information cue.

Advantageously, the main computer RC (2) comprises means for detecting an incompatibility between a configuration information cue relating to an item of equipment $EQ_i$ (10, 20, 30) and the first configuration information cue.

Advantageously, the main computer RC (2) transmits to the tag $ET_i$ (11, 21, 31), on each interruption of the system power supply, via the communication nodes $N_j$ (12, 22, 32), third information cues regarding a duration of operation of the item of equipment $EQ_i$ (10, 20, 30) and fourth information cues regarding a duration of power supply of the item of equipment $EQ_i$ (10, 20, 30), and the third information cues and the fourth information cues are stored in a memory of the tag $ET_i$ (11, 21, 31).

The equipment $EQ_i$ (10, 20, 30) comprises a built-in test device $BITE_i$ producing results of operational tests of the item of equipment $EQ_i$ and delivering test results messages which summarize information cues regarding an operating state of the item of equipment $EQ_i$ destined for a main computer RC (2) via a communication network of the system.

Advantageously, while the system (1) is operational, the device $BITE_i$ delivers, via the communication node $N_i$ (12, 22, 32), the entirety of the results of operational tests of the item of equipment $EQ_i$ (10, 20, 30) to the radio tag $ET_i$ (11, 21, 31) via the communication node $N_i$ and the main computer RC (2) transmits test results messages summarizing information cues regarding an operating state of the equipment $EQ_i$ (10, 20, 30) of the system.

Figure 3:
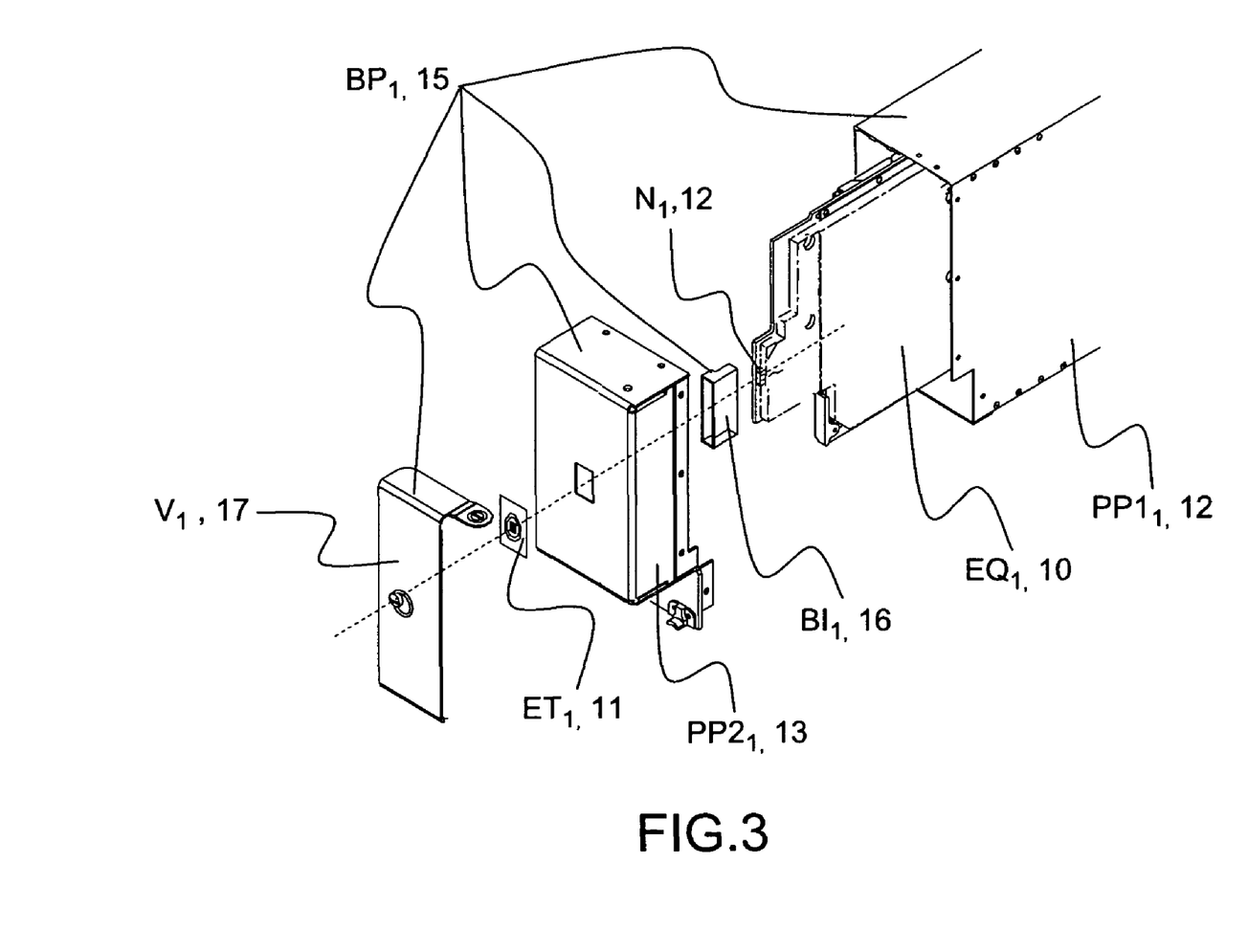
FIG. 3 represents an exploded perspective view of a first embodiment of a device according to the invention.

FIG. 3 represents an exploded perspective view of a first embodiment of a maintenance management device according to the invention related to an item of equipment $EQ_1$. The item of equipment $EQ_1$ is inserted into a protective housing $BP_1$ which comprises a first armour $PP1_1$, 12, a second armour $PP2_1$, 13, means of electromagnetic isolation $BI_1$, 16 and removable plugging means $V_1$, 17. The first armour and the second armour cooperate to form a first cavity, of parallelepipedal form able to accommodate the item of equipment $EQ_1$ which is for example a printed circuit card comprising electronic circuits. The second armour $PP2_1$ comprises a notch forming an opening in the first cavity.

The maintenance management device according to the invention comprises a radio tag $ET_1$ and a communication node $N_1$. The communication node $N_1$ occupies a position internal to the first cavity and it is devised to exchange data with the radio tag $ET_1$. The means of electromagnetic isolation protect the item of equipment $EQ_1$ from the electromagnetic emissions produced by the communication node $N_1$. The radio tag $ET_1$ is positioned on the second armour $PP2_1$, so as to obstruct the notch.

The radio tag $ET_1$ and the communication node $N_1$ are enclosed in a second cavity formed by the removable plugging means $V_1$ and the means of electromagnetic isolation. The removable plugging means $V_1$ are either in a closed state or in an open state.

The second cavity is sealed when the removable plugging means $V_1$ are in the closed state and open when the removable plugging means $V_1$ are in the open state.

Advantageously, the exchange of data between the radio tag $ET_i$ and the node $N_j$ is carried out by means of a contactless link.

Advantageously, the removable plugging means comprise a tiltable flap $V_i$ the open state of the removable plugging means corresponds to a position of the flap $V_1$ in which the radio tag $ET_i$ is visible from outside the housing, the closed state of the removable plugging means corresponds to a position of the flap $V_1$ in which the radio tag $ET_i$ is invisible from outside the housing.

When the removable plugging means $V_1$ are in the open state, the radio tag $ET_1$ is not protected against mechanical knocks but a maintenance team can read the content of the memory that it comprises by virtue of a radio tag reader/marker placed in proximity to the tag. Conversely, when the removable plugging means $V_1$ are in the closed state, the radio tag $ET_1$ is protected from mechanical knocks but a maintenance team cannot read the content of the memory that it comprises.

Figure 4A:
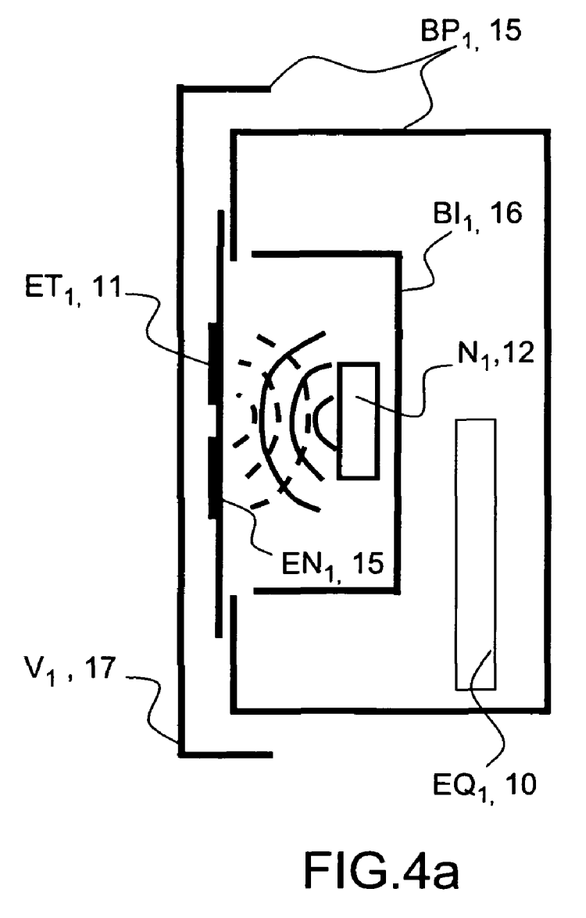
FIG. 4 represents a sectional view of the first embodiment of a device according to the invention, comprising removable plugging means in the open state and in the closed state.

FIG. 4a schematically represents, in a sectional view, the first embodiment of the device according to the invention comprising removable plugging means in the closed state.

In this figure as in those that follow, the first cavity is represented in one piece for the sake of simplification.

When the removable plugging means $V_1$ are in the closed state, the communication node $N_1$ can exchange data through a contactless link with the radio tag $ET_1$.

The contactless link is represented by circular concentric arcs. The solid arcs represent a radio wave emitted by the communication node $N_1$ and received by the radio tag $ET_1$. The dotted arcs represent a radio wave emitted by the radio tag $ET_1$ and received by the communication node $N_1$.

Figure 4B:
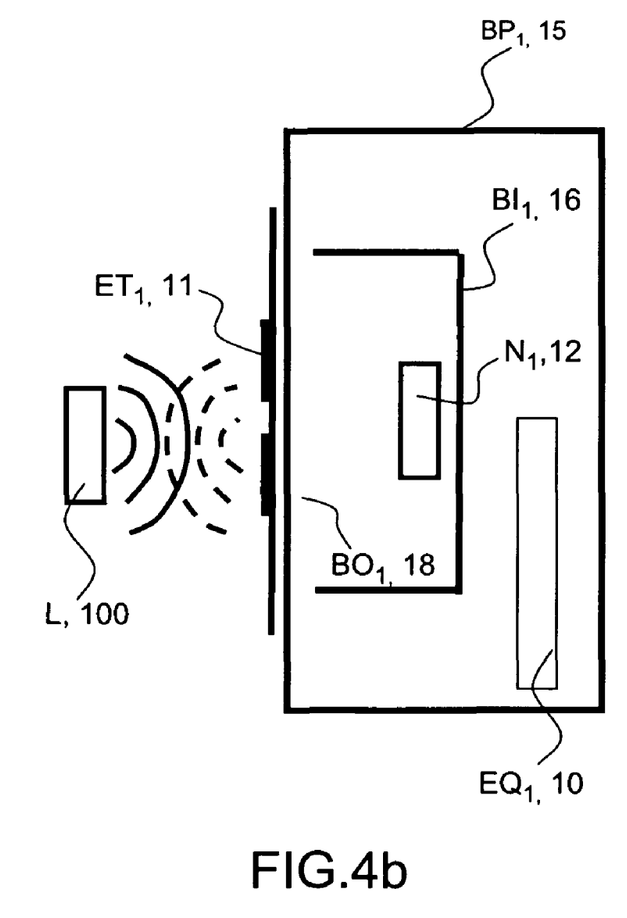

FIG. 4b schematically represents, in a sectional view, the first embodiment of the device according to the invention comprising removable plugging means in the open state.

When the removable plugging means $V_1$ are in the open state, the radio tag reader/marker L, 100 can furthermore register or read data in the memory of the radio tag $ET_1$ through a contactless link. The solid arcs represent a radio wave emitted by the radio tag reader/marker L and received by the radio tag $ET_1$. The dotted arcs represent a radio wave emitted by the radio tag $ET_1$ and received by the radio tag reader/marker L.

Figure 5A:
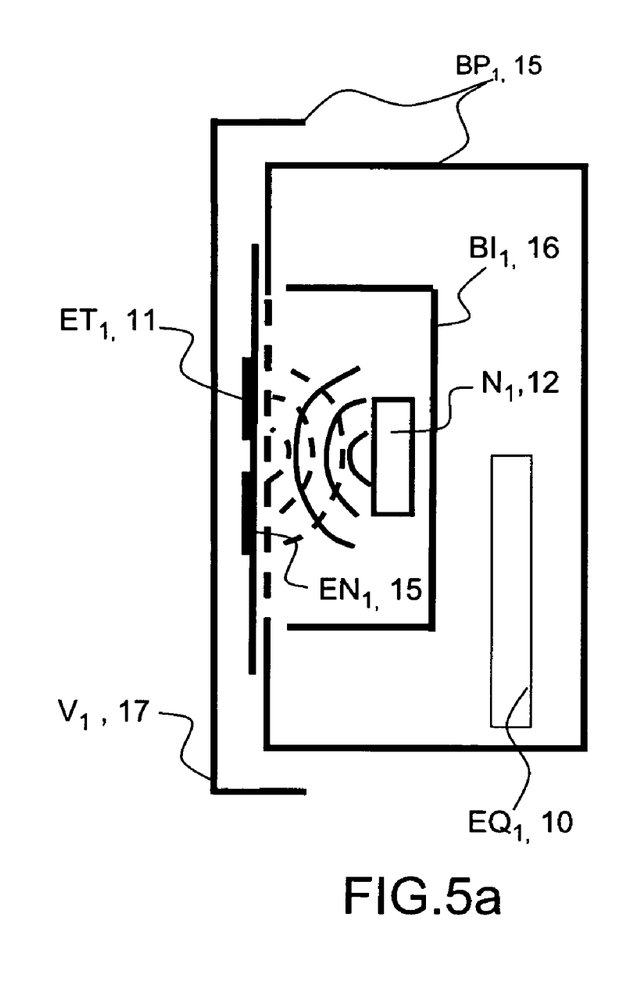
FIG. 5 represents a sectional view of a second embodiment of a device according to the invention, comprising removable plugging means in the open state and in the closed state.
Figure 5B:
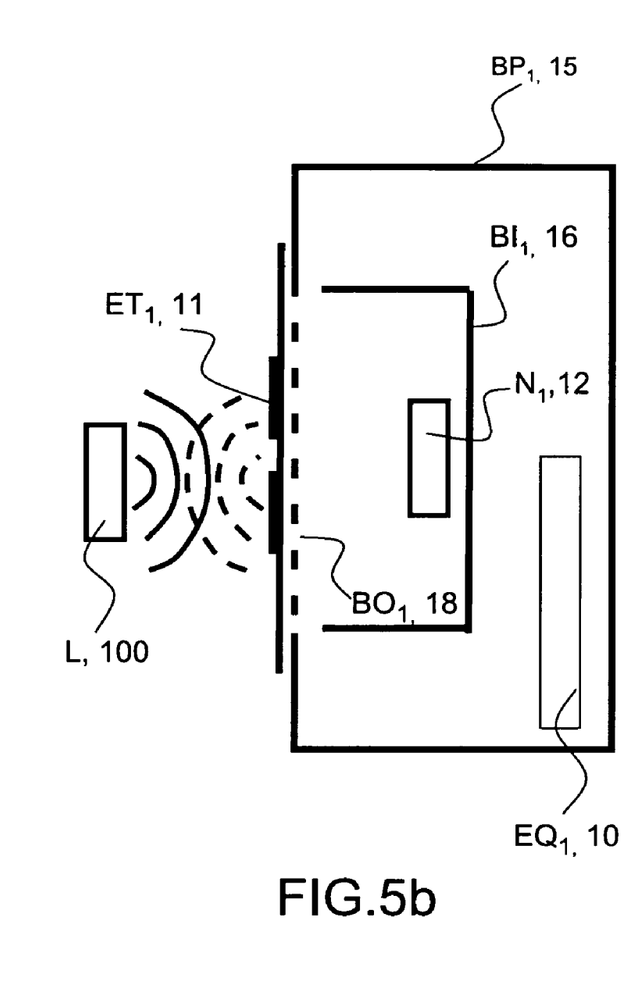

FIGS. 5a and 5b schematically represent, in a sectional view, a second embodiment of the device according to the invention comprising removable plugging means in the closed and open state respectively.

The second embodiment of the device according to the invention differs from the first embodiment in that the notch appearing on the first cavity is obstructed by a bung in an electrical conductor material, the radio tag $ET_1$ being disposed above the bung outside the first cavity.

The advantage afforded by this embodiment is an enhancement of mechanical protection of the radio tag $ET_1$.

Figure 6A:
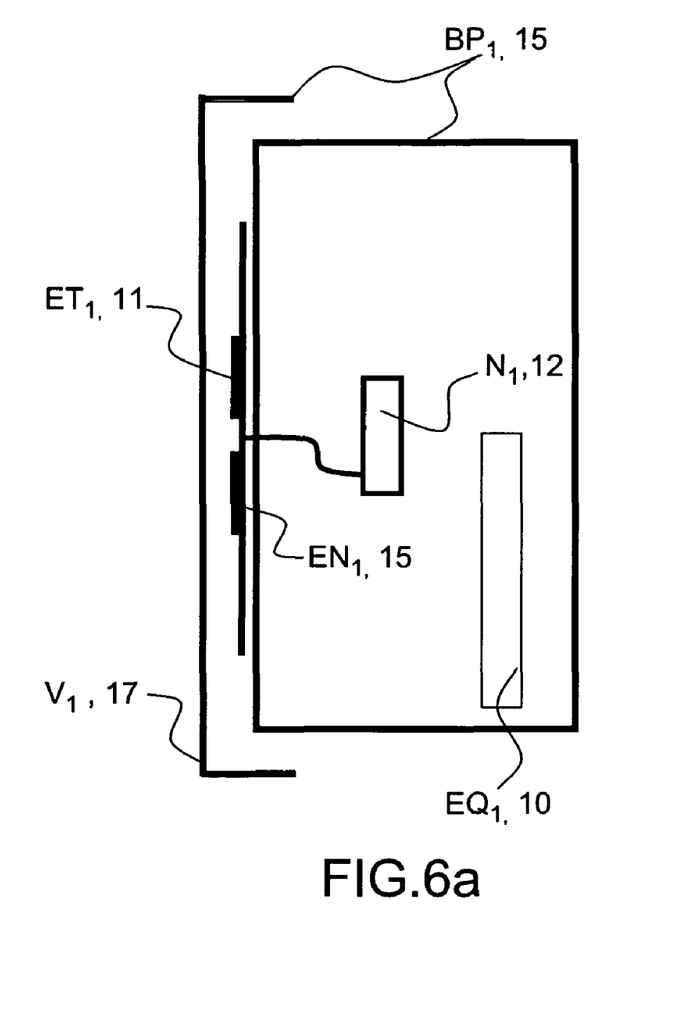
FIG. 6 represents a sectional view of a third embodiment of a device according to the invention, comprising removable plugging means in the open state and in the closed state.
Figure 6B:
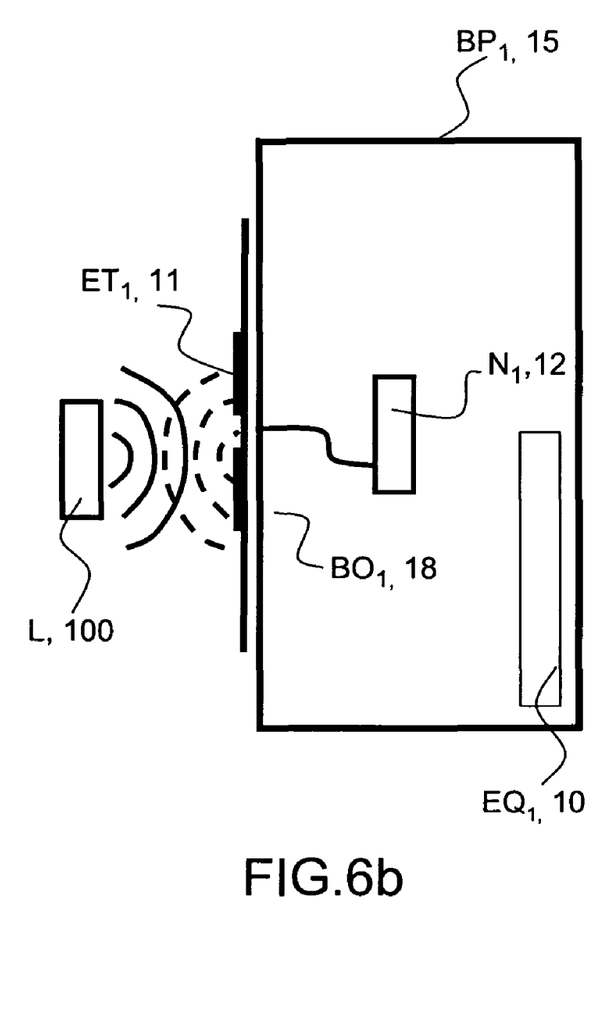

FIGS. 6a and 6b schematically represent, in a sectional view, a third embodiment of the device according to the invention comprising removable plugging means in the closed and open state respectively.

The third embodiment of the device according to the invention differs from the first in that the exchange of data between the radio tag $ET_i$ the node $N_j$ is carried out by means of a wire-based link. In this embodiment, the tag $ET_i$ comprises, furthermore, a second receiver $RE2_i$ which is devised to receive data originating from a wire-based link and a second emitter $EE2_i$ which is devised to emit data on a wire-based link. The said second emitter $EE2_i$ and second receiver $RE2_i$ are connected on the one hand to the memory $ME_j$ and on the other hand to the wire-based link.

Advantageously, the exchange of data between the radio tag $ET_i$ and the node $N_j$ is carried out by means of a wire-based link and the means of electromagnetic isolation consist of walls of the protective housing $BP_i$.

Additionally, the receiver $RN_i$ of the communication node $N_i$ is devised to receive data originating from a wire-based link and the emitter $EN_i$ is devised to emit data on a wire-based link. The emitter $EN_i$ and the receiver $RN_i$ are connected to the wire-based link.

Figure 7A:
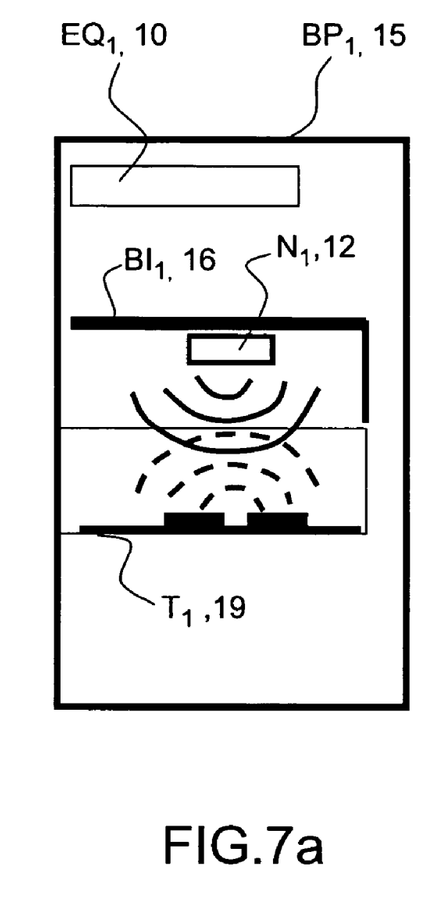
FIG. 7 represents a sectional view of a fourth embodiment of a device according to the invention, comprising removable plugging means in the open state and in the closed state.
Figure 7B:
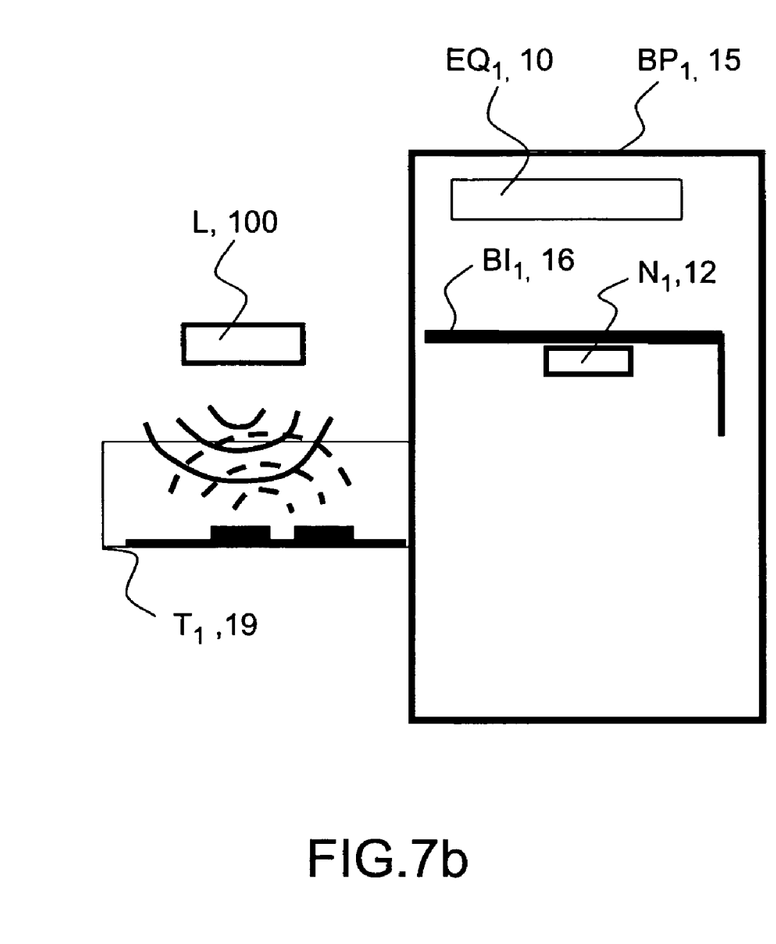

FIGS. 7a and 7b schematically represent, in a sectional view, a fourth embodiment of the device according to the invention comprising removable plugging means in the closed and open state respectively.

Advantageously, the removable plugging means comprise a sliding drawer $T_i$ and the open state corresponds to a position of the drawer in which the radio tag $ET_i$ is visible from outside the housing and the closed state corresponds to a position of the drawer in which the radio tag $ET_i$ is invisible from outside the housing.

The invention claimed is:

1. A device for managing maintenance of a number N of items of equipment $EQ_i$ built into a system, i designating an index identifying the item of equipment $EQ_i$ and lying between 1 and N, the system furthermore comprising a main computer RC, the equipment $EQ_i$ exchanging data with the main computer RC through a communication network, the equipment $EQ_i$ being capable of being built into the system or of being removed from the system, each item of equipment $EQ_i$ being protected by a protective housing $BP_i$, the communication node $N_j$ occupying a position internal to the housing $BP_i$ and being devised to exchange data with the radio tag $ET_i$, the radio tag $ET_i$ being fixed securely to the housing $BP_i$ and being devised to exchange data through a contactless link, wherein the housing $BP_i$ comprises:
an electromagnetic isolation unit of the communication node $N_i$ which protect the item of equipment $EQ_i$ from electromagnetic emissions produced by the communication node $N_i$;
a removable plugging unit configured to mask the radio tag $ET_i$ with respect to the exterior of the housing $BP_i$, the plugging unit being in a closed state or in an open state, wherein, when the removable plugging unit is in the closed state, the removable plugging unit prevents the radio tag $ET_i$ from delivering data outside the housing $BP_i$;
wherein the communication node $N_i$ and the tag $ET_i$ are inside a cavity formed by the electromagnetic isolation unit and the removable plugging unit, the cavity is sealed when the removable plugging unit is in a closed state.

2. The device according to claim 1, wherein the removable plugging unit of the housing $BP_i$ comprises a tiltable flap $V_i$ and in that the open state corresponds to a position of the flap in which the radio tag $ET_i$ is visible from outside the housing, and that the closed state corresponds to a position of the flap in which the radio tag $ET_i$ is invisible from outside the housing.

3. The device according to claim 1, wherein the removable plugging unit of the housing $BP_i$ comprises a sliding drawer $T_i$ and in that the open state corresponds to a position of the drawer in which the radio tag $ET_i$ is visible from outside the housing and that the closed state corresponds to a position of the drawer in which the radio tag $ET_i$ is invisible from outside the housing.

4. The device according to claim 1 wherein the radio tag $ET_i$ comprises:
a receiver $RE_i$ of data delivered by a communication node $N_j$ (12, 22, 32);
a memory $ME_i$ for storing data;
an emitter $EE_j$ for delivering data to a communication node $N_j$ (12, 22, 32), on request.

5. The device according to claim 1, wherein the exchange of data between the radio tag $ET_i$ and the communication node $N_j$ is carried out by means of a contactless link.

6. The device according to claim 1 wherein the communication node $N_i$ comprises:
a receiver, $RN_i$ of data delivered by a radio tag;
an emitter $EN_i$ for delivering data to a radio tag.

7. The device according to claim 1, the manufacturer of the system communicating a first information cue regarding applicable configuration of the system and a second information cue regarding identification of the system to the main computer during shipment of the system, wherein the main computer RC comprises means for transmitting, via the communication nodes Ni, the first information cue and the second information cue to all the radio tags $ET_i$, on each interruption of the system power supply.

8. The device according to claim 1, wherein the main computer RC comprises means for detecting an incompatibility between a configuration information cue relating to an item of equipment $EQ_i$ and the first configuration information cue.

9. The device according to claim 1 wherein data stored on the radio tag $ET_i$ are accessible when the item of equipment $EQ_i$ is not supplied with power or when the item of equipment $EQ_i$ is not built into the system.

10. The device according to claim 1 wherein the main computer RC transmits to the tag $ET_i$, on each interruption of the system power supply, via the communication nodes $N_j$, third information cues regarding a duration of operation of the item of equipment $EQ_i$ and fourth information cues regarding a duration of power supply of the item of equipment $EQ_i$, and in that the third information cues and the fourth information cues are stored in a memory of the tag $ET_i$.

11. The device according to claim 1, the equipment $EQ_i$ comprising a built-in test device $BITE_i$ the device $BITE_i$ producing results of operational tests of the item of equipment $EQ_i$ and delivering test results messages summarizing information cues regarding an operating state of the item of equipment $EQ_i$ destined for a main computer RC via a communication network of the system, wherein, while the system is operational, the device $BITE_i$ delivers, via the communication node $N_i$, the entirety of the results of operational tests of the item of equipment $EQ_i$ to the radio tag $ET_i$ via the communication node $N_i$ and in that the main computer RC transmits test results messages summarizing information cues regarding an operating state of the equipment $EQ_i$ of the system.

12. The device according to claim 1, wherein the exchange of data between the radio tag $ET_i$ and the node $N_j$ is carried out by means of a wire-based link and in that the electromagnetic isolation units consist of walls of the protective housing $BP_i$.

13. A method of managing maintenance of a number N of items of equipment $EQ_i$ built into a system, i designating an index identifying the item of equipment $EQ_i$ and lying between 1 and N, the item of equipment $EQ_i$ comprising a built-in test device $BITE_i$, the device $BITE_i$ delivering test results messages to a main computer RC of the system, via a communication network of the system, each item of equipment $EQ_i$ comprising a communication node $N_i$ and a tag $ET_i$ and being protected by a protective housing $BP_i$, the communication node $N_j$ occupying a position internal to the housing $BP_i$ and being devised to exchange data with the radio tag $ET_i$, the radio tag $ET_i$ being fixed securely to the housing $BP_i$ and being devised to exchange data through a contactless link, the said method being implemented by a device according to claim 1, the method comprising:

- transmitting, by the device $BITE_i$ to the tag $ET_i$, via the communication nodes $N_j$, the test results;
- storing the test results in a memory of the tag $ET_i$; and
- preventing, by the protective housing $BP_i$, the radio tag $ET_i$ from delivering data outside the housing $BP_i$ during a period that the protective housing $BP_i$ is in a closed configuration.

14. A device for managing maintenance of a number N of items of equipment $EQ_i$ built into a system, i designating an index identifying the item of equipment $EQ_i$ and lying between 1 and N, the system furthermore comprising a main computer RC, the equipment $EQ_i$ exchanging data with the main computer RC through a communication network, the equipment $EQ_i$ being capable of being built into the system or of being removed from the system, each item of equipment $EQ_i$ being protected by a protective housing $BP_i$, the communication node $N_j$ occupying a position internal to the housing $BP_i$ and being devised to exchange data with the radio tag $ET_i$, the radio tag $ET_i$ being fixed securely to the housing $BP_i$ and being devised to exchange data through a contactless link, means of electromagnetic isolation of the communication node $N_i$ which protect the item of equipment $EQ_i$ from electromagnetic emissions produced by the communication node $N_i$; removable plugging means which mask the radio tag $ET_i$ with respect to the exterior of the housing $BP_i$, the plugging means being in a closed state or in an open state;

- wherein the communication node $N_i$ and the tag $ET_i$ are inside a cavity formed by the means of electromagnetic isolation and the removable plugging means, the cavity is sealed when the removable plugging means are in a closed state,
- wherein, when the removable plugging means are in the closed state, the removable plugging means are configured to prevent the radio tag $ET_i$ from delivering data outside the housing $BP_i$.

15. The device according to claim 14, wherein the removable plugging means comprise a tiltable flap $V_i$ and in that the open state corresponds to a position of the flap in which the radio tag $ET_i$ is visible from outside the housing, and that the closed state corresponds to a position of the flap in which the radio tag $ET_i$ is invisible from outside the housing.

16. The device according to claim 14, wherein the removable plugging means comprise a sliding drawer $T_i$ and in that the open state corresponds to a position of the drawer in which the radio tag $ET_i$ is visible from outside the housing and that the closed state corresponds to a position of the drawer in which the radio tag $ET_i$ is invisible from outside the housing.

17. The device according to claim 14, wherein the radio tag $ET_i$ comprises:

- a receiver $RE_i$ of data delivered by a communication node $N_j$ (12, 22, 32);
- a memory $ME_i$ for storing data;
- an emitter $EE_j$ for delivering data to a communication node $N_j$ (12, 22, 32), on request.

18. The device according to claim 14, wherein the exchange of data between the radio tag $ET_i$ and the communication node $N_j$ is carried out by means of a contactless link.

* * * * *